United States Patent
Zujewski (10) Patent No.: US 12,271,048 B2
(45) Date of Patent: Apr. 8, 2025

(54) EMERGENCY CABLE BREAKING MECHANISM

(71) Applicant: CORNING RESEARCH & DEVELOPMENT CORPORATION, Corning, NY (US)

(72) Inventor: Mateusz Tomasz Zujewski, Lodz (PL)

(73) Assignee: CORNING RESEARCH & DEVELOPMENT CORPORATION, Corning, NY (US)

(*) Notice: Subject to any disclaimer, the term of this patent is extended or adjusted under 35 U.S.C. 154(b) by 148 days.

(21) Appl. No.: 18/201,403

(22) Filed: May 24, 2023

(65) Prior Publication Data

US 2023/0296857 A1    Sep. 21, 2023

Related U.S. Application Data

(63) Continuation of application No. PCT/US2021/059997, filed on Nov. 19, 2021.

(60) Provisional application No. 63/119,258, filed on Nov. 30, 2020.

(51) Int. Cl.
*G02B 6/44* (2006.01)
(52) U.S. Cl.
CPC .............. *G02B 6/44785* (2023.05)
(58) Field of Classification Search
CPC ..................................... G02B 6/44
USPC .......................................... 385/136
See application file for complete search history.

(56) References Cited

U.S. PATENT DOCUMENTS

| 4,438,293 A | * | 3/1984 | Voser | H01B 7/182 |
| | | | | 174/79 |
| 5,076,104 A | * | 12/1991 | Glaesemann | G01M 11/088 |
| | | | | 73/830 |
| 5,268,986 A | * | 12/1993 | Kakii | G02B 6/4441 |
| | | | | 385/135 |

(Continued)

FOREIGN PATENT DOCUMENTS

| AU | 8688191 A | * | 5/1992 |
| BR | PI0517181 A | * | 10/2008 |

(Continued)

OTHER PUBLICATIONS

International Search Report and Written Opinion of the International Searching Authority; PCT/US2021/059997; dated Feb. 15, 2022; pp. 10; International Searching Authority.

(Continued)

*Primary Examiner* — Kaveh C Kianni
(74) *Attorney, Agent, or Firm* — William D. Doyle (57) ABSTRACT

Embodiments of a tensile strength limiting system are provided. The tensile strength limiting system is configured to cause breakage of an optical fiber cable at a predetermined tensile loading below a tensile strength of the optical fiber cable. The tensile strength limiting system includes a force limiter configured for attachment to the optical fiber cable strung on an aerial pole and a restriction clip through which the optical fiber cable is configured to be looped. At the predetermined tensile loading, the force limiter is configured to allow the optical fiber cable to pull through the restriction clip; and the restriction clip is configured to force the optical fiber cable to bend below a minimum bend radius of a strength member within the optical fiber cable such that the strength member breaks.

15 Claims, 11 Drawing Sheets

(56) References Cited

U.S. PATENT DOCUMENTS

| | | | | |
|---|---|---|---|---|
| 6,554,524 | B1* | 4/2003 | Smith | H02G 7/04 403/322.2 |
| 7,474,829 | B2* | 1/2009 | Xia | G02B 6/4457 385/136 |
| 8,842,956 | B2* | 9/2014 | O'Riorden | G02B 6/4402 385/108 |
| 2005/0151069 | A1* | 7/2005 | Beinhocker | G01J 1/42 250/227.15 |
| 2006/0261259 | A1* | 11/2006 | Beinhocker | G01J 1/42 250/227.15 |
| 2007/0263966 | A1* | 11/2007 | Cody | G02B 6/4431 385/112 |
| 2012/0090507 | A1* | 4/2012 | Lambrechts | E04C 5/012 106/644 |
| 2012/0320535 | A1* | 12/2012 | Berghmans | G02B 6/3849 361/728 |
| 2015/0197408 | A1* | 7/2015 | St. Germain | D07B 1/148 340/668 |
| 2018/0361879 | A1* | 12/2018 | Bosze | H01B 5/105 |
| 2019/0011657 | A1* | 1/2019 | Baker | G02B 6/4431 |
| 2019/0278041 | A1* | 9/2019 | Miller | G02B 6/44785 |
| 2020/0073072 | A1* | 3/2020 | Fabris | G02B 6/44 |
| 2021/0348356 | A1* | 11/2021 | Wendeler-Goeggelmann | E02B 3/126 |
| 2024/0024090 | A1* | 1/2024 | Weigel | A61L 29/16 |

FOREIGN PATENT DOCUMENTS

| | | | | |
|---|---|---|---|---|
| CN | 103597388 | A * | 2/2014 | B29C 65/02 |
| FR | 3079628 | A1 | 10/2019 | |
| GB | 2470284 | A | 11/2010 | |
| WO | 2017/075218 | A1 | 5/2017 | |
| WO | 2017/109517 | A1 | 6/2017 | |

OTHER PUBLICATIONS

Extended European Search Report, EP application No. 21898951.5, dated Sep. 20, 2024, 8 pages, EP patent office.

\* cited by examiner

EMERGENCY CABLE BREAKING MECHANISM

CROSS-REFERENCE TO RELATED APPLICATION

This application is a continuation of International Application No. PCT/US2021/059997 filed Nov. 19, 2021, which claims the benefit of priority under 35 U.S.C. § 119 of U.S. Provisional Application Ser. No. 63/119,258, filed on Nov. 30, 2020, the content of which is relied upon and incorporated herein by reference in its entirety.

BACKGROUND

The disclosure relates generally to optical fiber cable installations and in particular to systems configured to limit the tensile strength of an optical fiber cable and related methods. In general, an optical fiber cable that has a high tensile strength is good for installation and service life, especially to counteract the effects of thermal cycling (e.g., low temperature shrinkage and high temperature sagging). However, the optical fiber cable can in some circumstances become ensnared on an object, such as a passing vehicle. In this regard, the cable's high tensile strength may cause the cable to pull on the aerial poles from which it is suspended, the passing vehicle on which it becomes ensnared, or other surrounding objects if the cable does not break after the object becomes ensnared on the cable, which may damage the aerial poles, passing vehicle, or other surrounding objects.

SUMMARY

According to an aspect, embodiments of the disclosure relate to a tensile strength limiting system. The tensile strength limiting system is configured to cause breakage of an optical fiber cable at a predetermined tensile loading below a tensile strength of the optical fiber cable. The tensile strength limiting system includes a force limiter configured for attachment to the optical fiber cable strung on an aerial pole and a restriction clip through which the optical fiber cable is configured to be looped. At the predetermined tensile loading, the force limiter is configured to allow the optical fiber cable to pull through the restriction clip; and the restriction clip is configured to force the optical fiber cable to bend below a minimum bend radius of a strength member within the optical fiber cable such that the strength member breaks.

According to another aspect, embodiments of the disclosure relate to a method of installing an optical fiber cable on an aerial pole in a manner that limits a tensile strength of an optical fiber cable. The optical fiber cable includes a strength member having a minimum bend radius. In the method, the optical fiber cable is attached to a force limiter configured to release the optical fiber cable at a predetermined load below the tensile strength of the optical fiber cable. The optical fiber cable is looped through a restriction in at least one loop. When the predetermined load is applied to the optical fiber cable, the force limiter releases the optical fiber cable such that the optical fiber cable is pulled through the restriction causing the at least one loop to collapse below the minimum bend radius to break the strength member.

According to still another aspect, embodiments of the disclosure relate to an optical fiber cable installation. The installation includes an aerial pole, an optical fiber cable having a strength member, and a tensile strength limiting system. The optical fiber cable has a tensile strength, and the strength member has a minimum bend radius. The tensile strength limiting system is configured to cause the optical fiber cable to break at a predetermined tensile loading below the tensile strength of the optical fiber cable. The tensile strength limiting system includes a force limiter attached to the optical fiber cable and a restriction through which the optical fiber cable is looped. At the predetermined tensile loading, the force limiter is configured to allow the optical fiber cable to pull through the restriction. The restriction is configured to force the optical fiber cable to bend below the minimum bend radius of the strength member such that the strength member breaks.

Additional features and advantages will be set forth in the detailed description that follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

BRIEF DESCRIPTION OF THE DRAWINGS

The accompanying drawings are included to provide a further understanding and are incorporated in and constitute a part of this specification. The drawings illustrate one or more embodiment(s), and together with the description serve to explain principles and the operation of the various embodiments. In the drawings.

DETAILED DESCRIPTION

Referring generally to the figures, various embodiments of a tensile strength limiting system and related methods are provided herein. The tensile strength limiting system is configured to cause an optical fiber cable to fail in tension at a loading less than it would otherwise fail absent the tensile strength limiting system. In particular, optical fiber cables typically include at least one strength member that may prevent the optical fiber cable from failing at a tensile loading below 2000 lbs. However, in certain circumstances, especially for cable strung between aerial poles, objects may become ensnared in the cable, and failing at a lower tensile loading may be advantageous in terms of damage to the system overall, to the object, or to the surroundings of the cable and aerial pole. Thus, as disclosed herein, the optical fiber cable is looped through a restriction and attached to a force limiter (e.g., slippable clamp or breakaway swivel) configured to fail at a predetermined tensile loading less than the tensile strength of the optical fiber cable. After the force limiter fails, the optical fiber cable is pulled through the restriction, collapsing the loop and snapping the strength member by bending it below its minimum bend radius. By snapping the strength member, the optical fiber cable fails at a much lower tensile loading, e.g., at less than half the tensile strength of the optical fiber (800 lbs. or lower, 600 lbs. or lower, or even 400 lbs. or lower in some embodiments). Advantageously, the tensile strength limiting system can be made from currently available cable pulling and clamping components, and the optical fiber cable does not have to otherwise be modified. In this way, a strong optical fiber cable can be used to facilitate installation, but the optical fiber cable will still fail at a specified predetermined loading when in service. These and other aspects and advantages will be discussed more fully below and in relation to the drawing. The embodiments presented herein are provided by way of example and not by way of limitation.

Figure 1:
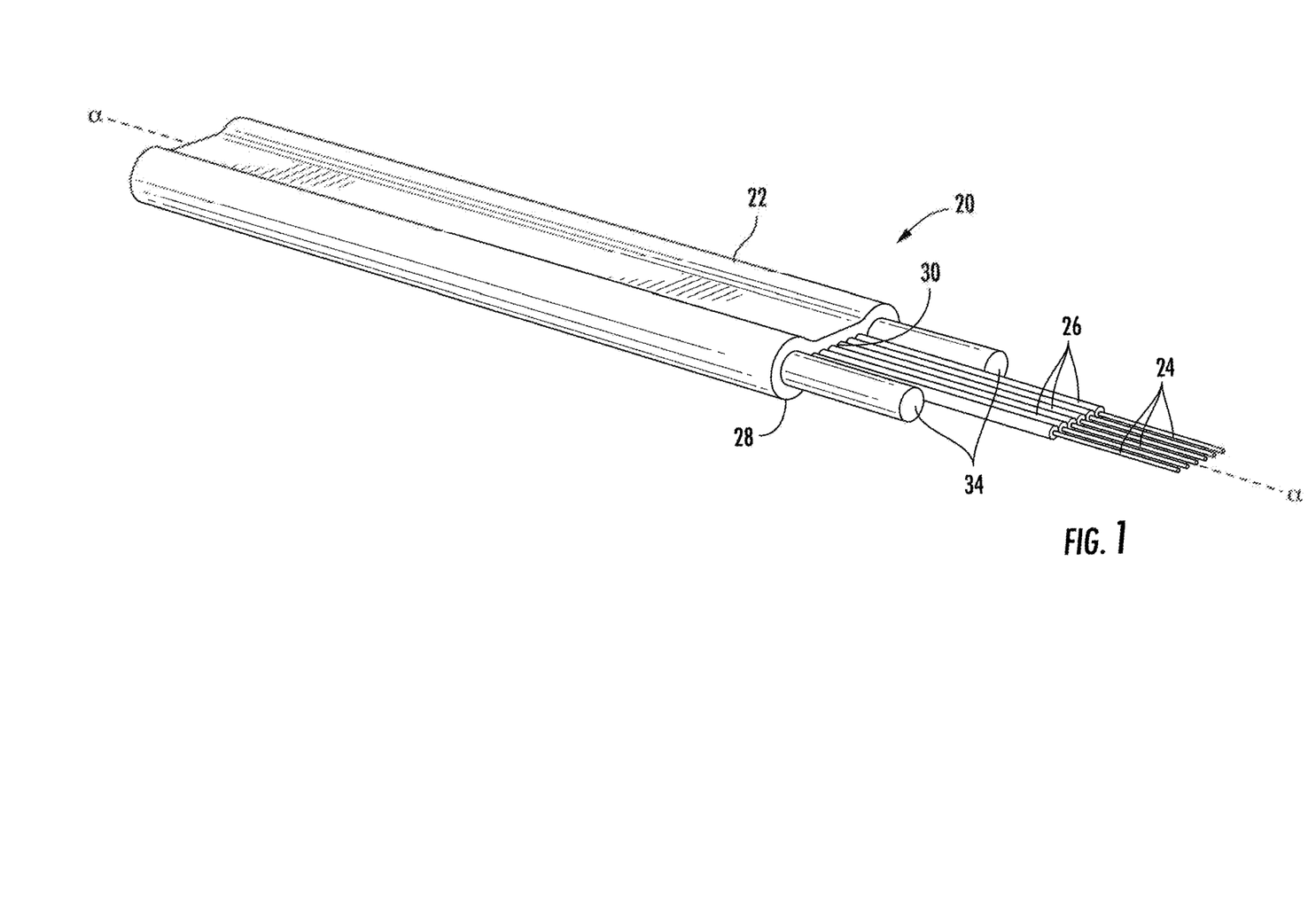
FIG. 1 depicts an optical fiber cable usable in the tensile strength limiting system, according to an exemplary embodiment.

FIG. 1 depicts an embodiment of an optical fiber cable 20 that may be used in the tensile strength limiting system described hereinbelow. The optical fiber cable 20 extends along longitudinal axis a and includes a cable jacket 22 surrounding a plurality of optical fibers 24. In the embodiment depicted in FIG. 1, the plurality of optical fibers 24 is six optical fibers 24, but in other embodiments, the optical fiber cable 20 may include fewer than six optical fibers 24 or more than six optical fibers 24. For example, the optical fiber cable 20 may include up to 144 optical fibers or even up to 288 optical fibers. Further, in the embodiment depicted in FIG. 1, each optical fiber 24 is circumferentially surrounded by a buffer tube 26 in a tight-buffered configuration. In embodiments, the cable jacket 22 has an outer surface 28 and an inner surface 30. In embodiments, the inner surface 30 surrounds and is in contact with the buffer tubes 26 along the length of the optical fiber cable 20. In embodiments, the tight-buffered optical fibers 24 are arranged in a substantially planar configuration within the optical fiber cable 20.

The embodiment of the optical fiber cable 20 depicted in FIG. 1 also includes strength members 34, which are rods running along the longitudinal axis a of the optical fiber cable 20 that provide tensile strength to the optical fiber cable 20. In embodiments, the strength members 34 are glass reinforced plastic rods. As will be discussed more fully below, the strength members 34 have a minimum bend radius below which the strength member 34 will break. That is, bending the optical fiber cable 20 into a loop having a bend radius below the minimum bend radius will cause the strength members 34 to fail, such that the optical fiber cable 20 will also fail.

Figure 2:
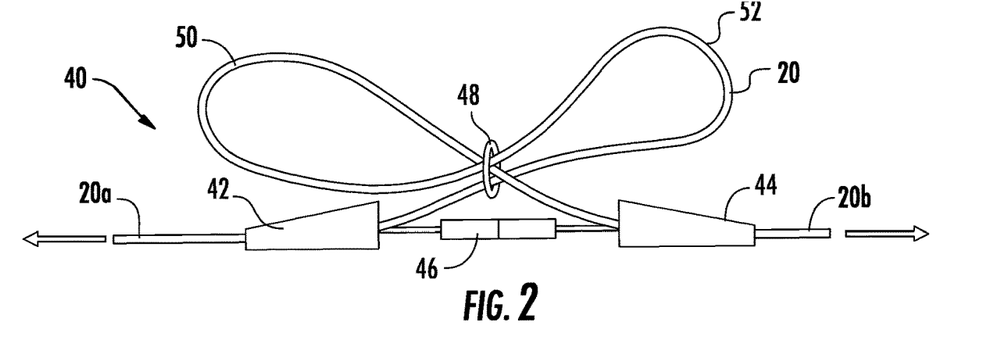
FIG. 2 depicts a tensile strength limiting system having two pull clamps and a breakaway swivel, according to an exemplary embodiment.

FIG. 2 depicts an embodiment of a tensile strength limiting system 40 designed to cause the optical fiber cable 20 to break at a predetermined tensile loading. The embodiment of the tensile strength limiting system 40 shown in FIG. 2 is installed in a middle section of an aerially-suspended optical fiber cable 20. The system 40 includes a first pull clamp 42 and a second pull clamp 44. The first pull clamp 42 is provided on a first end 20a of the optical fiber cable 20, and the second pull clamp 44 is provided on a second end 20b of the optical fiber cable 20. The pull clamps 42, 44 frictionally hold the optical fiber cable 20 such that when the ends 20a, 20b are placed under tension (e.g., as would be the case when the cable 20 is suspended aerially) the cable 20 does not slip through the pull clamps 42, 44.

In the embodiment shown in FIG. 2, the system 40 includes a force limiter, shown as breakaway swivel 46, connecting the pull clamps 42, 44. As will be discussed below, the force limiter can be configured to break apart at a predetermined tensile stress. The section of cable between the pull clamps 42, 44 is looped in at least one loop through a restriction 48. In embodiments, the restriction 48 is a metal, plastic, ceramic, or composite ring. In embodiments, the restriction 48 is circular, quadrangular, or another polygonal or curved shape. Further, in embodiments, the restriction 48 is sized to allow an optical connector to pass therethrough. For example, if the optical fiber cable 20 is terminated with an OptiTap® connector (available from Corning Incorporated, Corning, NY), then the restriction 48 may have a minimum inner measurement (e.g., inner diameter) that is wider than the width of the OptiTap® connector, which has a width of about 20 mm.

In the embodiment shown in FIG. 2, the optical fiber cable 20 passes through the restriction 48 three times, creating a first loop 50 and a second loop 52. The loops 50, 52 are sized such that the optical fiber cable 20 is curved above the minimum bend radius of the strength members 34 of the optical fiber cable 20. In embodiments, the minimum bend radius of the optical fiber cable 20 is 6.5 inches. In another embodiment, the minimum bend radius is 9 inches.

If a tensile force above a predetermined threshold level is applied to an end 20a, 20b of the optical fiber cable 20, the force limiter breaks and the loops 50, 52 of the optical fiber cable 20 are pulled through the restriction 48. In doing so, the loops 50, 52 shrink such that the optical fiber cable is curved below the minimum bend radius of the strength members 34, causing the strength members 34 to snap and allowing the optical fiber cable 20 to break part.

In the embodiment depicted, the breakaway swivel 46 is used as a force limiter. Upon breaking of the breakaway swivel 46, the middle section of the optical fiber cable 20 between the pull clamps 42, 44 will pull through the restriction 48, which will also cause the loops 50, 52 to shrink below the minimum bend radius of the strength members 34. As such, the optical fiber cable 20 can be made to break at a predetermined tensile stress set by the breakaway swivel 46. While FIG. 2 depicts a breakaway swivel 46 as the force limiter, the pull clamps 42, 44 can also be used as a force limiter in other embodiments, including other embodiments described below.

Figure 3:
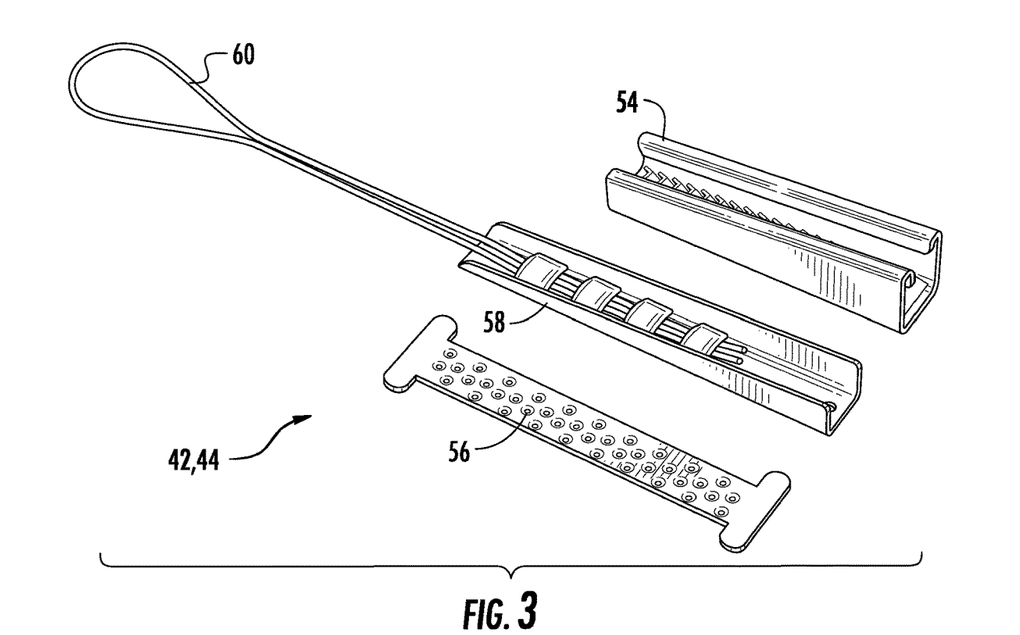
FIG. 3 depicts a pull clamp usable in the tensile strength limiting system, according to an exemplary embodiment.

FIG. 3 depicts an exemplary embodiment of a pull clamp 42, 44. In general, a pull clamp as known in the art will have a construction similar to what is described herein, and thus, the pull clamp shown in FIG. 3 is provided for context in discussing the various embodiments of the tensile strength limiting system 40 in which a pull clamp is used. However, other pull clamp designs may be used, and the disclosure should not be construed as limiting to a particular type of pull clamp. With respect to the embodiment shown in FIG. 3, the pull clamp 42, 44 includes a U-shaped sheath 54 into which an optical fiber cable 20 is inserted. As can be seen in FIG. 3, the sheath 54 tapers from one end to another. A shim 56 is placed over the optical fiber cable 20 and within the sheath 54. Thereafter, a wedge 58 is inserted into the sheath 54. The wedge 58 tapers at a same angle as the sheath 54. In this way, the wedge 58 is forced into the sheath 54, pinching the optical fiber cable 20 between the shim 56 and the bottom of the sheath 54 to prevent slipping of the optical fiber cable 20. In other embodiments, the cable 20 may be pinched between the wedge 58 and the sheath 54 without the use of a shim 56.

The pull clamps 42, 44 shown in FIG. 2 are not designed to fail before the breakaway swivel 46, but in other embodiments, the pull clamps 42, 44 can be configured as the force limiter. In such embodiments, the pull clamp 42 is referred to as a "slippable" pull clamp because the slippable pull clamp is configured to hold the optical fiber cable 20 up to a predetermined tensile stress whereupon the clamp slips, releasing the optical fiber cable 20. In a sense, all pull clamps are slippable if loaded beyond their rated strength, but as used herein, pull clamps that are used as the force limiter (i.e., the first component to fail in the tensile strength limiting system 40) are referred to as "slippable" and other pull clamps designed to hold the cable are referred to as only "pull clamp."

In embodiments, the slippable pull clamp 42 is configured to hold the optical fiber cable 20 to a tensile loading of, e.g., up to 400 lbs., up to 600 lbs., or up to 800 lbs. The slippable pull clamp 42 can be configured to fail at the predetermined tensile loading in a variety of ways. In an embodiment, the length of the wedge 58 relative to the length of the sheath 54 is manipulated. In particular, shortening the length of the wedge 58 or sheath 54 relative to the length of the sheath 54 or wedge 58, respectively, will reduce the maximum tensile load that the slippable pull clamp 42, 44 is able to withstand before failing. In other embodiments, the angle of the taper of the wedge 58 and the sheath 54 can be manipulated to change the maximum tensile loading. In particular, a steeper taper will result in a higher maximum tensile loading, and a shallower taper will result in a lower maximum tensile loading. In still another embodiment, the material of the wedge 58 and sheath 54 can be manipulated to affect the maximum tensile loading. In particular, using a softer material for the wedge 58 and/or sheath 54 will lower the maximum tensile loading, and using a harder material for the wedge 58 and/or sheath 54 will increase the maximum tensile loading.

In embodiments, the pull clamp 42 (which may be slippable) further includes a connector ring 60. The connector ring 60 can be used to connect the (slippable) pull clamp 42 to the breakaway swivel 46 as shown in FIG. 2, or to an aerial pole or other similar cable mounting location, as shown in the embodiments described below. In the embodiment shown in FIG. 3, the connector ring 60 latches into the wedge 58. In this way, when the connector ring 60 is attached to a connection point, the tension on the cable 20 and on the connector ring 60 will pull the wedge 58 further into the sheath 54 so as to create a stronger pinching force on the cable 20 in the (slippable) pull clamp 42. Accordingly, below the predetermined tensile loading, the (slippable) pull clamp 42 may be configured to prevent the optical fiber cable 20 from slipping between the sheath 54 and the wedge 58, whereas above the predetermined tensile loading, the wedge 58 at least partially dislodges from the sheath 54 to allow the optical fiber cable 20 to slip between the wedge 58 and the sheath 54.

Figure 4:
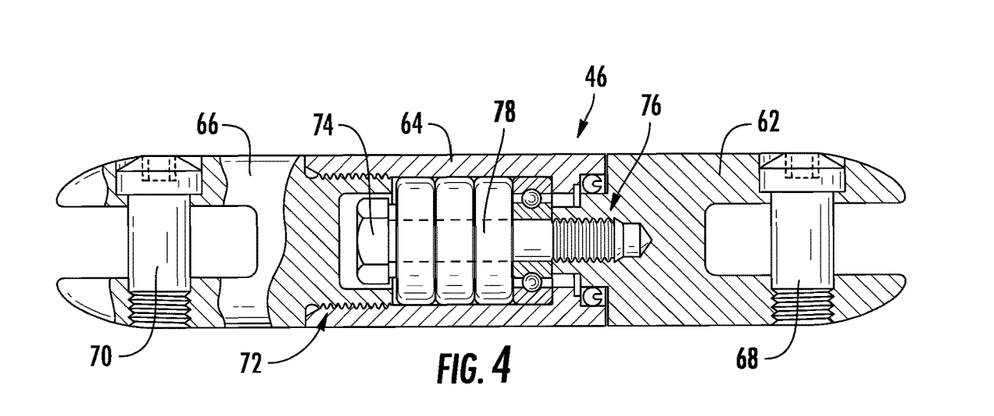
FIG. 4 depicts a breakaway swivel usable in the tensile strength limiting system, according to an exemplary embodiment.

FIG. 4 depicts an embodiment of a breakaway swivel 46. As with the pull clamp of FIG. 3, the breakaway swivel 46 shown in FIG. 4 is merely illustrative of the various types of breakaway swivels known in the art. In general, breakaway swivels include an element designed to fail at a particular tensile loading. In the embodiment shown in FIG. 4, the breakaway swivel 46 includes a first end portion 62, a second middle portion 64, and a third end portion 66. The first end portion 62 includes an anchor point 68, and the third end portion 66 includes another anchor point 70. The anchor points 68, 70 may be used, e.g., for attachment of a connector ring 60 of a pull clamp 42, 44 or for attachment to an aerial pole.

The third end portion 66 is connected to the second middle portion 64 via a threaded engagement 72. The second middle portion 64 is connected to the first end portion 62 via a pin 74 that is mated to the first end portion 62 via threaded engagement 76. When assembling the breakaway swivel 46, the pin 74 is selected based on the predetermined maximum tensile loading. Specifically, pins 74 of different diameters, materials, heat treatments, microstructures, etc. can be selected such that the pin 74 fails at a predetermined loading level. Upon failure of the pin 74, the second middle portion 64 and the third end portion 66 will separate from the first end portion 62. In embodiments, the breakaway swivel 46 may be provided with one or more bearings 78 to allow for rotation of the second middle portion 64 and third end portion 66 relative to the first end portion 62.

Figure 5:
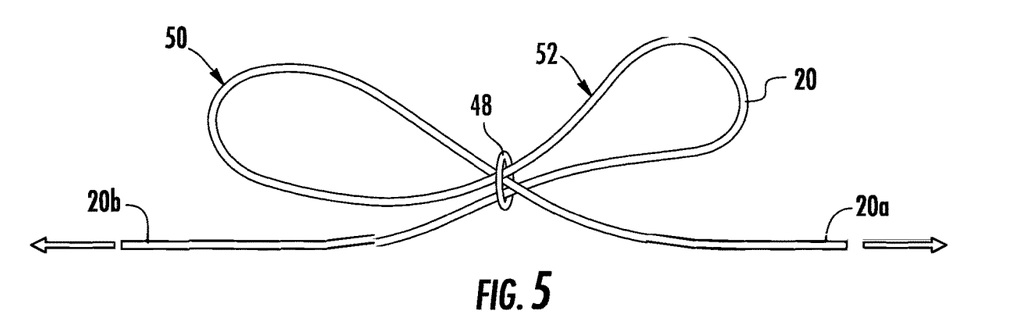
FIGS. 5-7 depict configurations of an optical cable looped through the restriction of the tensile strength limiting system, according to exemplary embodiments.
Figure 6:
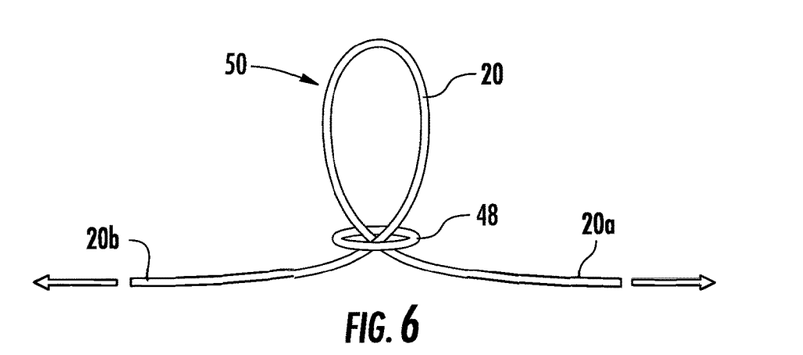
Figure 7:
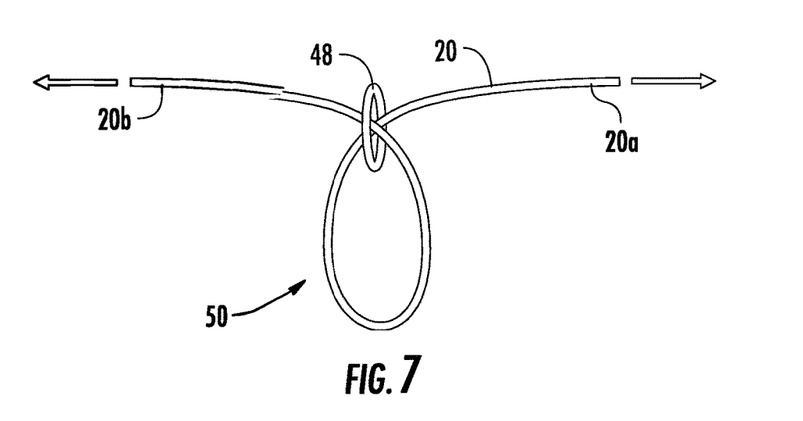

Having described the components of the tensile strength limiting system 40, description of over various embodiments and configurations of the system 40 are provided below. FIGS. 5-7 depict configurations of the cable 20 within the restriction 48. FIG. 5 depicts the optical fiber cable 20 passing through the restriction three times, producing two loops 50, 52 (e.g., as also shown in FIG. 2). When tensile force is applied to the ends 20a, 20b of the optical fiber cable 20, the loops 50, 52 will be pulled through the restriction 48, collapsing the loops to a bend radius below the minimum bend radius and causing the strength members 34 to snap. In the embodiment of FIG. 5, using two loops 50, 52 allows for the restriction 48 to be placed around the cable 20 when a free end (e.g., end 20a or end 20b) is not available or cannot be easily twisted to form a loop (e.g., because of the rigidity of the strength member(s) 34).

In FIG. 6, the optical fiber cable 20 passes through the restriction 48 twice, creating a single loop 50. In particular, the optical fiber cable 20 is looped on the interior of the restriction 48. When tensile forces are applied to the ends 20a, 20b of the cable 20, the single loop 50 will collapse as the optical fiber cable 20 passes out of the restriction 48, causing the minimum bend radius of the strength members to be exceeded and snapping the strength members. FIG. 7 also depicts a single loop 50, but the optical fiber cable 20 is looped from the interior of the restriction 48 around the exterior of the restriction 48. However, a tensile force applied to the ends 20a, 20b of the optical fiber cable 20 still collapses the loop 50 to a bend radius below the minimum bend radius, causing the strength members to snap. The cable 20 of FIG. 7 experiences less frictional forces than the cable 20 of FIG. 6 when the optical fiber cable 20 is pulled through the restriction 48 to collapse the loop 50. Any of these loop 50 configurations can be used with the restriction 48 in the tensile strength limiting systems 40 described herein.

Figure 8:
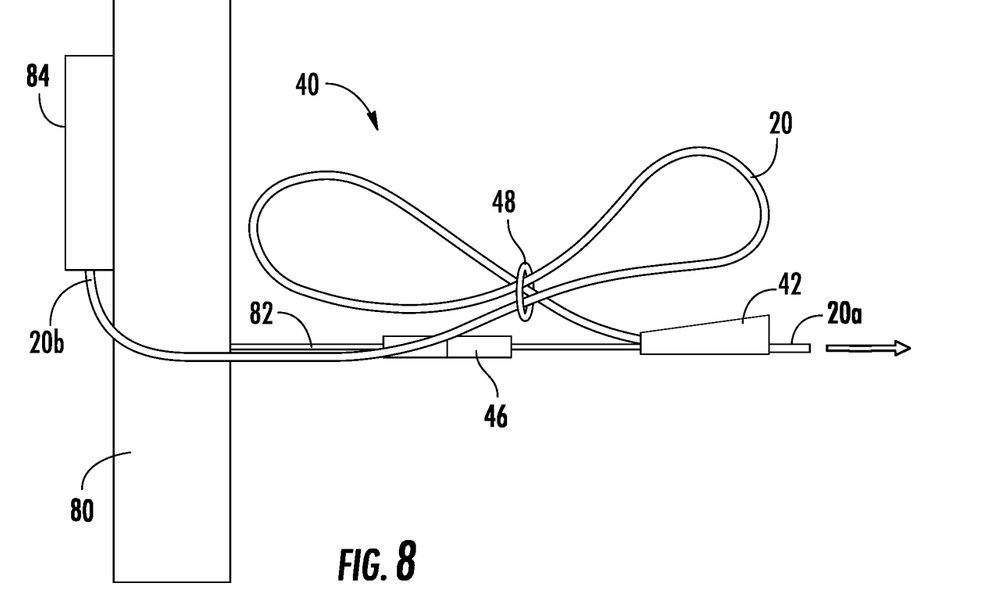
FIG. 8 depicts a force limiting system connected at one end to an aerial pole, according to an exemplary embodiment.

FIG. 8 depicts another embodiment of the tensile strength limiting system 40. The system 40 is substantially similar to the system 40 depicted in FIG. 2 except that, in the system of FIG. 8, one end of the breakaway swivel 46 is connected to an aerial pole 80 by a mounting feature 82. The mounting feature 82 may be any of a variety of mounting features known in the art, such as a suspension cable, tether, bracket, hook, ring, etc. On the aerial pole 80, a multi-port terminal 84 is mounted, and the second end 20b of the optical fiber cable 20 is terminated in the multi-port terminal 84. If a tensile force is applied to the first end 20a of the optical fiber cable 20, the breakaway swivel 46 is designed to fail at a specified loading, causing the optical fiber cable 20 to pull through the restriction 48. This, in turn, causes the optical fiber cable 20 to collapse below the minimum bend radius, snapping the strength members 34 contained therein.

Figure 9:
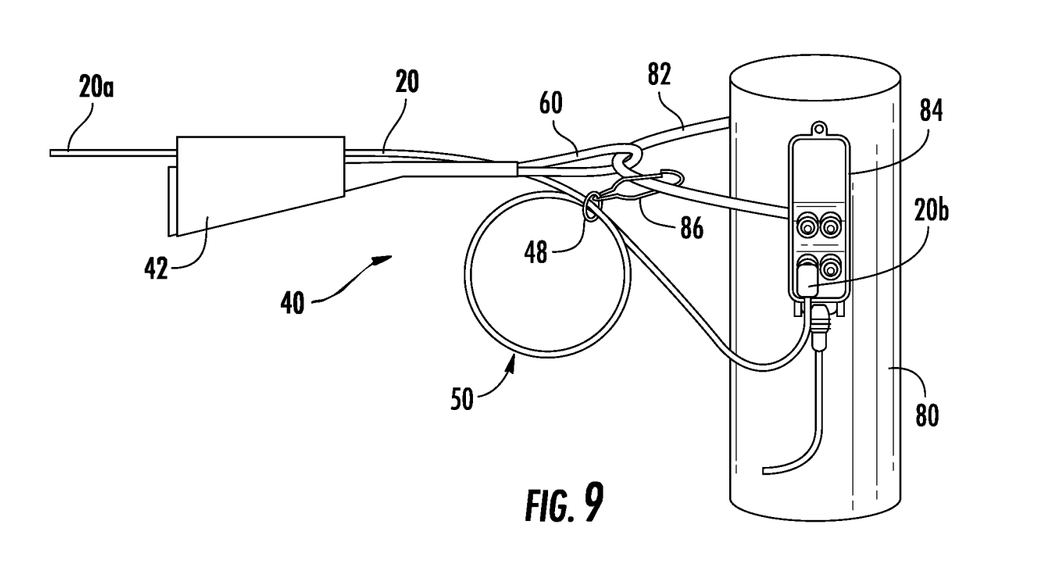
FIGS. 9 and 10 depict an embodiment of a tensile strength limiting system connected to an aerial pole before and after the optical fiber cable is pulled through the restriction, according to an exemplary embodiment.
Figure 10:
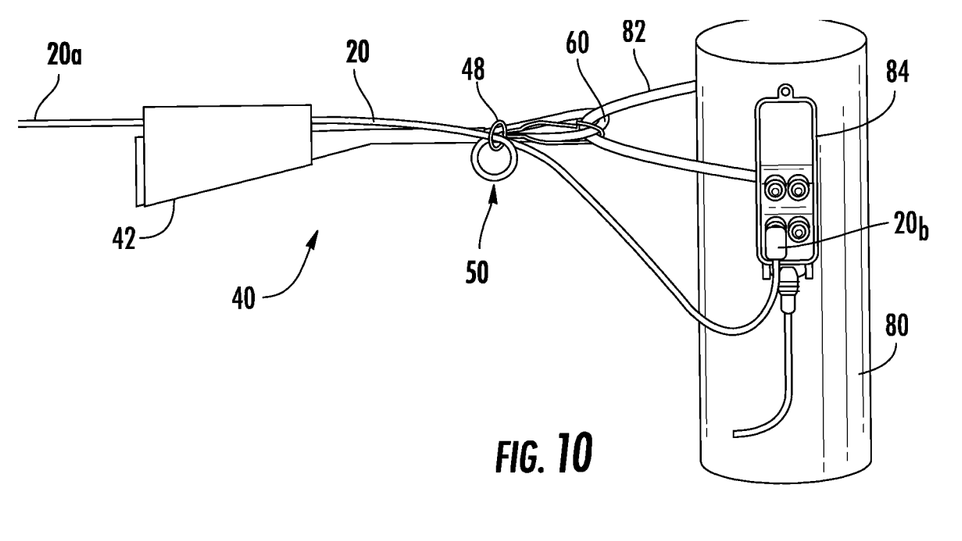

FIGS. 9 and 10 depict another embodiment of the tensile strength limiting system 40. As with the previous embodiment, the second end 20b of the optical fiber cable 20 terminates at a multi-port terminal 84 mounted on an aerial pole 80. However, in the embodiment shown in FIGS. 9 and 10, a slippable pull clamp 42 is used as the force limiter, and the connector ring 60 of the slippable pull clamp 42 is connected directly to the mounting feature 82 attached to the aerial pole 80. Additionally, the system 40 includes a clasp 86 connecting the restriction 48 to the mounting feature 82 in order to control how and where the loop 50 hangs relative to the aerial pole 80.

FIG. 9 depicts the system 40 prior to a threshold level of tension being applied to first end 20a of the optical fiber cable 20. As can be seen, the optical fiber cable 20 has a loop 50 with a curvature above the minimum bend radius of the strength member 34. As shown in FIG. 10, the threshold level of tension is applied to the first end 20a of the optical fiber cable 20, and the optical fiber cable 20 slips the slippable pull clamp 42, collapsing the loop 50 to the point where the strength member 34 snaps. Additionally, the clasp 86 ensures that the second end 20b of the optical fiber cable 20 is not under enough tensile load to rip the multi-port terminal 84 from the aerial pole 80. In embodiments, the clasp 86 can withstand an additional 400 N of force after the slippable pull clamp 42 breaks.

Figure 11A:
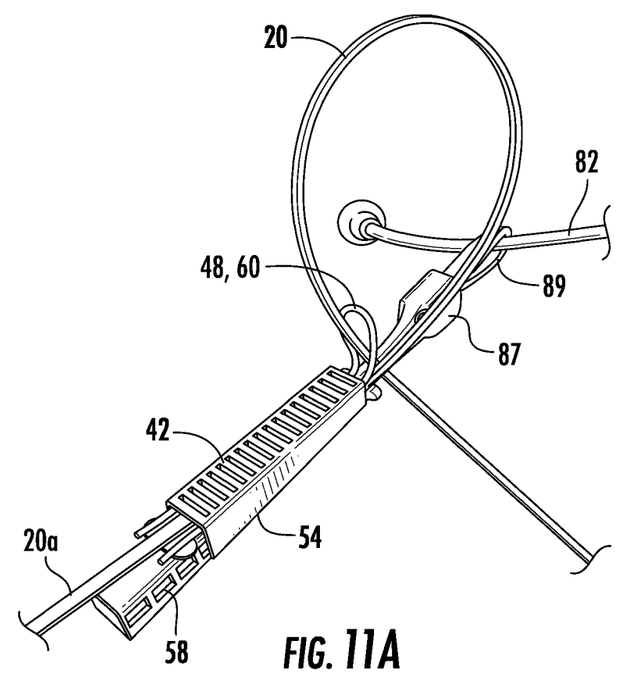
FIGS. 11A and 11B depict embodiments of a tensile strength limiting system in which the restriction is incorporated into the pull clamp, according to exemplary embodiments.
Figure 11B:
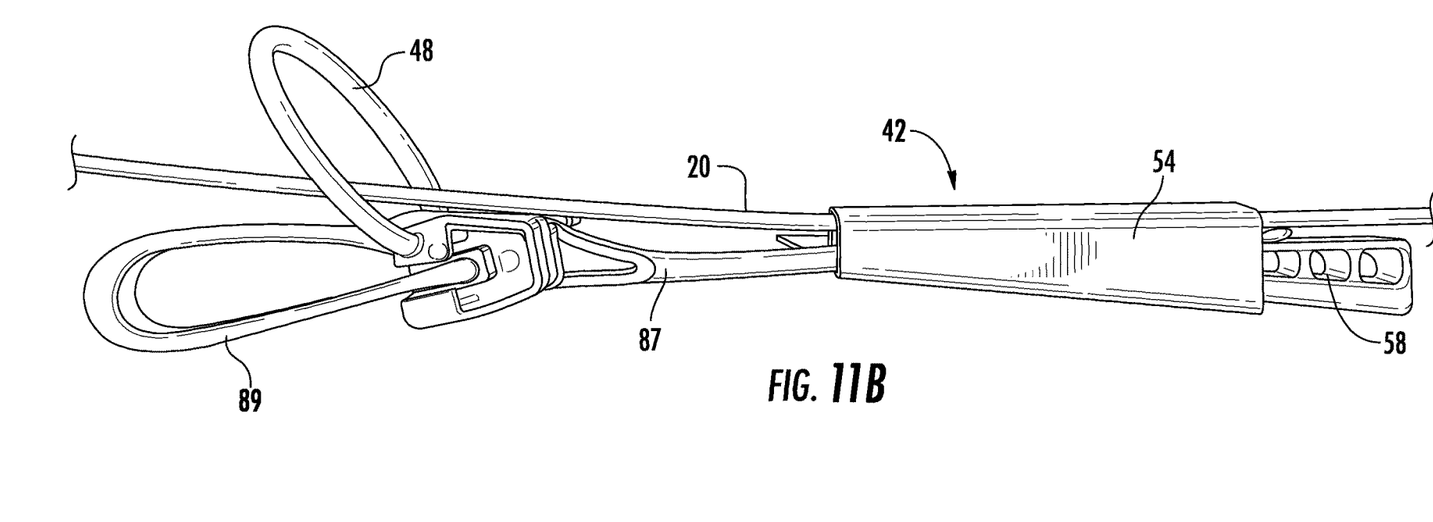

FIG. 11A depicts another embodiment of the tensile strength limiting system 40 in which the restriction 48 is incorporated in the slippable pull clamp 42. In particular, the wedge 58 of the slippable pull clamp 42 includes an extension region 87 having a strap 89 connected thereto. The strap 89 wraps around the mounting feature 82 to secure the slippable pull clamp 42 to an aerial pole 80. The connector ring 60 is bent transversely, particularly in a substantially perpendicular manner, to the sheath 54 to serve as the restriction 48. In this way, the optical fiber cable 20 is looped backwards through the restriction 48 (i.e., connector ring 60) to form the loop 50. FIG. 11B depicts another embodiment in which the restriction 48 is incorporated in the slippable pull clamp 42. As can be seen, the wedge 58 again includes an extension region 87 and a strap 89 configured to wrap around the mounting feature 82. In the embodiment of FIG. 11B, extension region 87 is molded around the restriction 48. Advantageously, the slippable pull clamp 42 having the integral restriction 48 allows for the all of the elements of the tensile strength limiting system to be included in a single component, simplifying installation.

Figure 12:
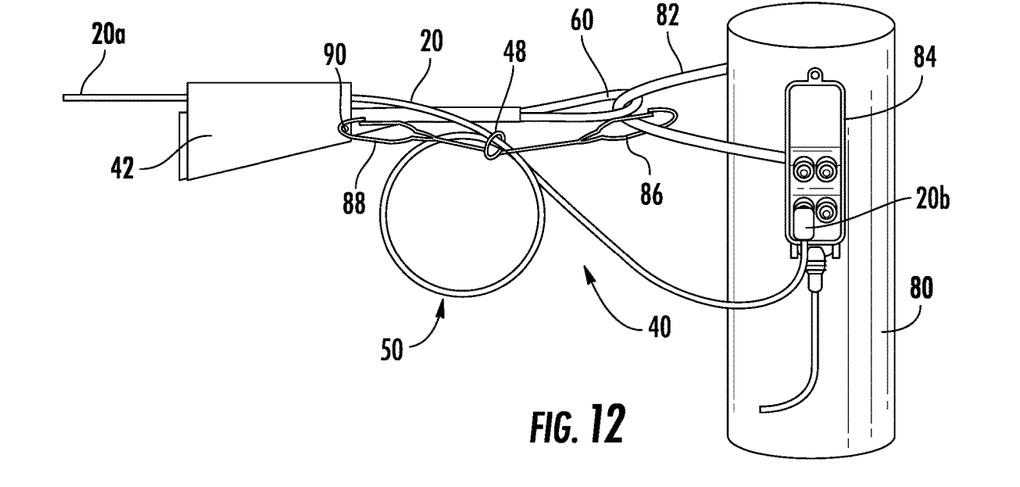
FIGS. 12 and 13 depict an embodiment of a tensile strength limiting system before and after the optical fiber cable is pulled through the restriction, which is clasped to both the aerial pole and to the pull clamp, according to an exemplary embodiment.
Figure 13:
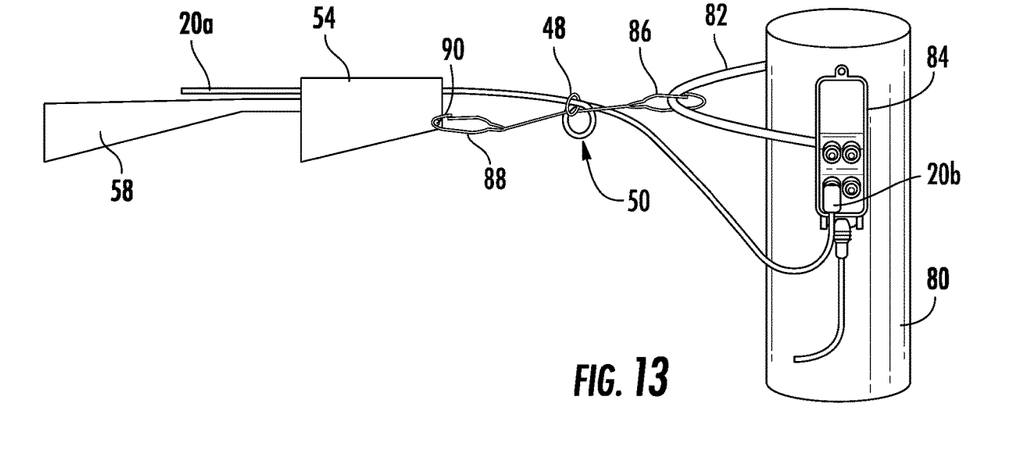

FIGS. 12 and 13 depict an embodiment of the tensile strength limiting system 40 substantially similar to what is depicted in FIGS. 9 and 10. However, in FIGS. 12 and 13, the tensile strength limiting system 40 includes a second clasp 88 attaching the sheath 54 to the restriction 48 at attachment point 90 (e.g., rivet, pin, fastener, integrally molded retaining ring, etc.). In this way, when the wedge 58 is pulled from the sheath 54, releasing the optical fiber cable 20, the sheath 54 maintains its connection to the aerial pole 80 via the linkage between the second clasp 88, restriction 48, first clasp 86, and mounting feature 82. As such, when the cable 20 breaks, control can be maintained over the components so as not to create any hazards.

Figure 14:
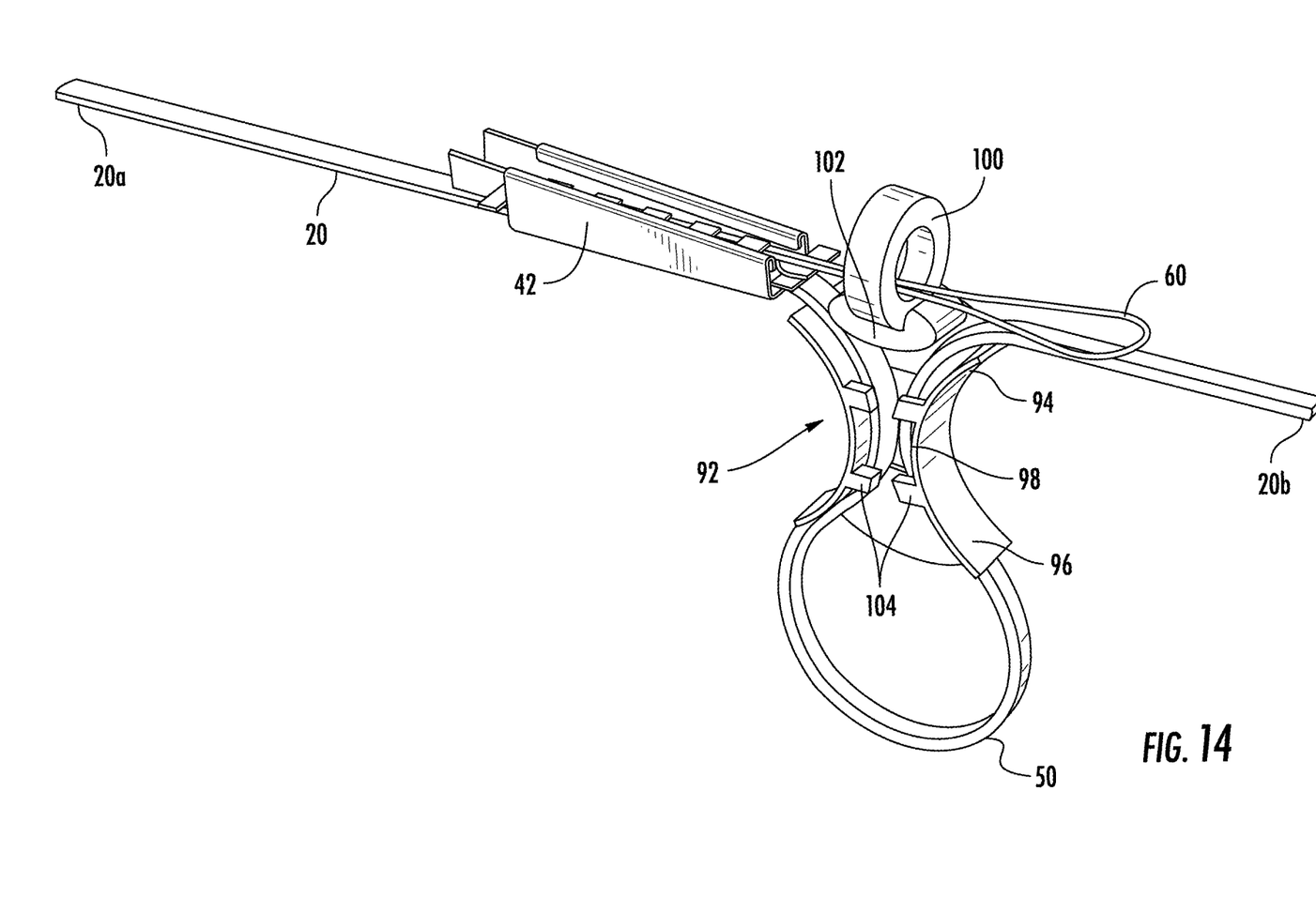
FIG. 14 depicts an embodiment of a molded restriction, according to an exemplary embodiment.

FIG. 14 depicts an embodiment of a molded restriction 92. The molded restriction 92 includes a first flared region 94, a second flared region 96, and a neck region 98 disposed between the first flared region 94 and the second flared region 96. The optical fiber cable 20 enters into the first flared region 94, extends through the neck region 98, and exits through the second flared region 96. Upon exiting the second flared region 96, the optical fiber cable 20 is formed into a loop 50 and enters back into the second flared region 96, extends through the neck region 98, and exits the first flared region 94 toward the aerial pole 80.

In embodiments, the molded restriction 92 includes a ring 100 situated on a head portion 102. The head portion 102 is disposed in the first flared region 94 and helps to guide the optical fiber cable 20 into the neck region 98 and keep the optical fiber cable 20 retained within the molded restriction 92. The optical fiber cable 20 is also maintained in the molded restriction 92 by retaining ribs 104 that extend at least partially across the first flared region 94, the neck region 98, and/or the second flared region 96. The head portion 102 also provides a mounting surface for the molded ring 100 through which the connector ring 60 of the slippable pull clamp 42 extends.

Figure 15:
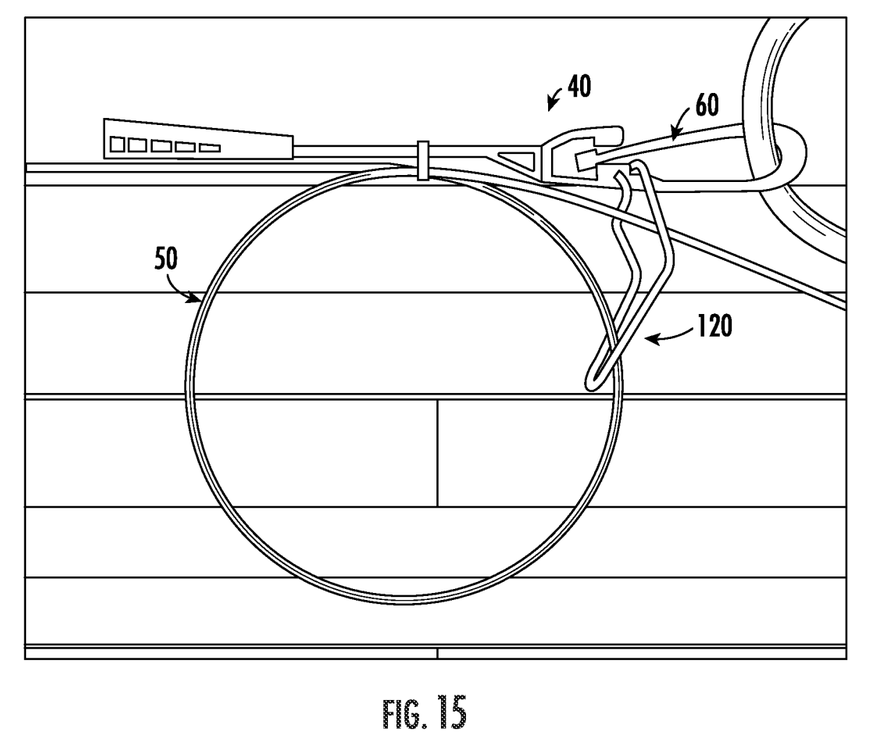
FIG. 15 depicts an embodiment of a tensile strength limiting system with a restriction clip, according to an exemplary embodiment.
Figure 16:
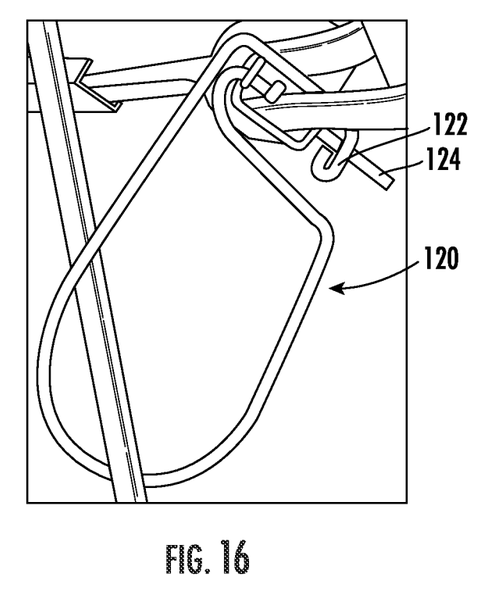
FIG. 16 is a close-up view of the restriction clip used in the tensile strength limiting system of FIG. 15, according to an exemplary embodiment.
Figure 17:
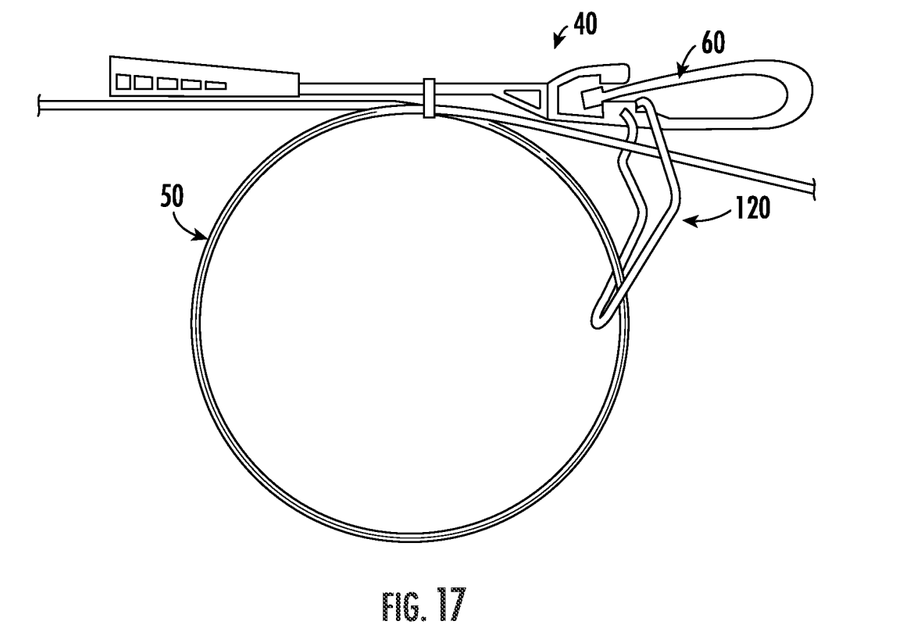
FIGS. 17 and 18 depict an embodiment of the tensile strength limiting system of FIGS. 15 and 16, before and after the optical fiber cable is pulled through the restriction clip, according to an exemplary embodiment.
Figure 18:
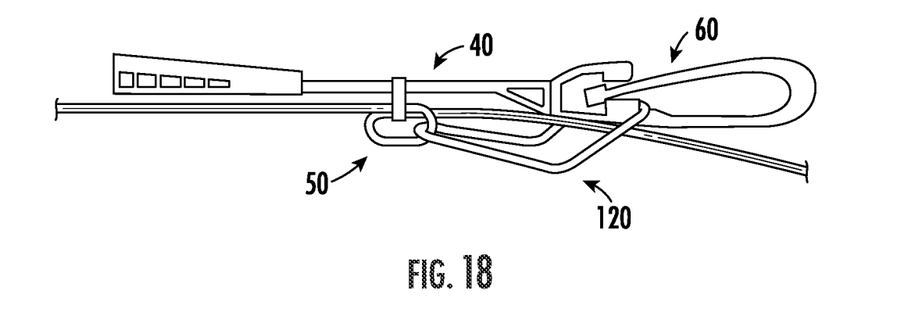
Figure 19A:
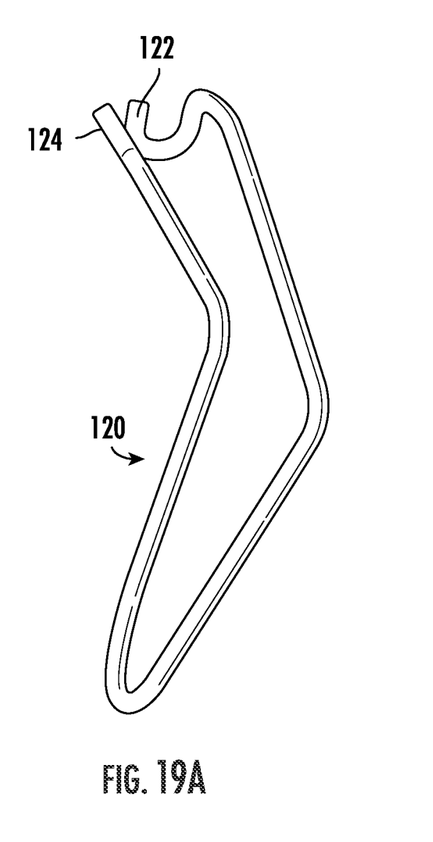
FIGS. 19A and 19B depict an embodiment of a restriction clip in an open and closed position, according to an exemplary embodiment.
Figure 19B:
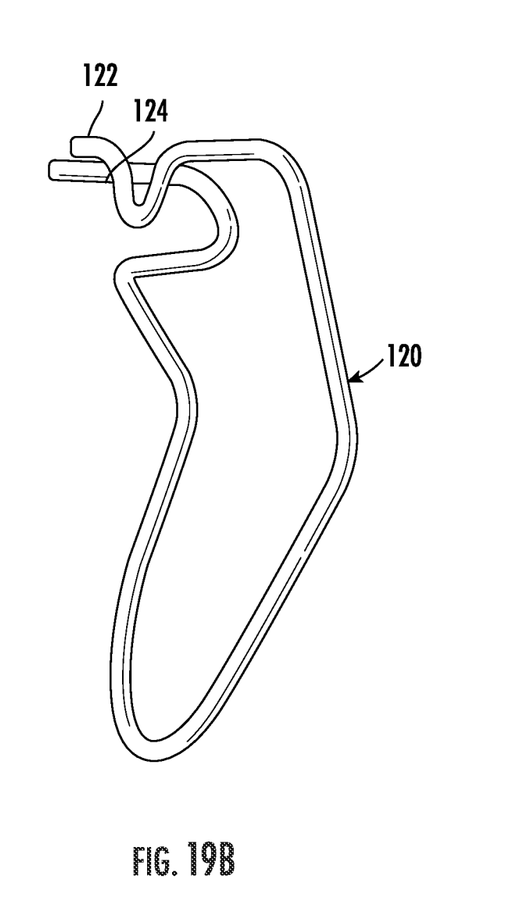

In accordance with yet other aspects of the present disclosure, FIGS. 15 through 18 depict an embodiment of the tensile strength limiting system 40 similar to that pictured in FIGS. 9 and 10, wherein a singular clip device 120 replaces and serves as both the restriction 48 and the first clasp 86. As shown in FIGS. 15 and 16, the clip 120 may be a formed from a metal spring wire that opens and closes via a catch 122, similar to a safety pin. The resiliency of the design allows the clip 120 to open to slide around the cable loop 50 prior to attaching to the connector ring 60. The clip 120 may be closed by ensuring that the first arm 124 is pulled behind the catch 122. In this configuration, and as shown in FIGS. 17 and 18, once activated the clip 120 now acts as the restriction. As the loop 50 closes, the cable tightens over the clip 120 until the cable's strength members 34 break. Because of being able to open the clip 120 may be installed after the cable is already in place, as one does not have to run the cable through a closed ring prior to installation. Moreover, the flexibility and design of the clip 120 ensure efficient installation without significant training or effort. As shown in the figures, the slack management system of loop 50 may be easily configured, as a tie device 126, such as the zip tie shown in FIG. 17 may be easily applied to hold the slack loop 50. FIG. 19A illustrates the clip 120 in an open position with the first arm 124 disengaged from the catch 122 such that the clip 120 may open to be installed around the cable 20 and or attached to the clamp via the connector ring 60 or through some other suitable mounting mechanism provided for on the clamp. FIG. 19B illustrates the clip 120 in a closed position with the first arm 124 engaged by the catch 122 to close the clip and provide the necessary restriction once mounted for the system 40 to work as intended.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more than one component or element, and is not intended to be construed as meaning only one.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. A tensile strength limiting system configured to cause breakage of an optical fiber cable at a predetermined tensile loading below a tensile strength of the optical fiber cable, the tensile strength limiting system comprising:
    a force limiter configured for attachment to the optical fiber cable;
    a restriction clip through which the optical fiber cable is configured to be looped;
    wherein, at the predetermined tensile loading, the force limiter is configured to allow the optical fiber cable to pull through the restriction clip; and
    wherein the restriction clip is configured to force the optical fiber cable to break when bent below a minimum bend radius of a strength member within the optical fiber cable.

2. The tensile strength limiting system of claim 1, wherein the force limiter comprises a slippable pull clamp comprising a sheath and a wedge, wherein, below the predetermined tensile loading, the slippable pull clamp is configured to prevent the optical fiber cable from slipping between the sheath and the wedge, and wherein, above the predetermined tensile loading, the wedge at least partially dislodges from the sheath to allow the optical fiber cable to slip between the wedge and the sheath.

3. The tensile strength limiting system of claim 2, wherein the restriction clip is attached to the slippable pull clamp.

4. The tensile strength limiting system of claim 3, wherein the restriction clip comprises a metal wire having a first arm and a catch, wherein the first arm engages the catch to close an otherwise open loop formed by the restriction clip.

5. The tensile strength limiting system of claim 2, wherein the slippable pull clamp includes an extension region having a strap connected thereto configured for securing the slippable pull clamp to an aerial pole.

6. The tensile strength limiting system of claim 2, wherein the wedge tapers at a same angle as the sheath.

7. The tensile strength limiting system of claim 6, wherein a shim is placed over the optical fiber cable and within the sheath such that when the wedge is forced into the sheath, the optical fiber cable is pinched between the shim and the sheath to prevent slipping of the optical fiber cable.

8. The tensile strength limiting system of claim 2, wherein the force limiter is a breakaway swivel having a first end portion, a second middle portion, and a third end portion.

9. The tensile strength limiting system of claim 8, wherein the first end portion includes an anchor point and the third end portion includes a second anchor point, the first and second anchor points being used for attachment of the connector ring of the slippable pull clamp or for attachment to an aerial pole.

10. The tensile strength limiting system of claim 9, wherein the third end portion is connected to the second middle portion via a threaded engagement and the second middle portion is connected to the first end portion via a pin that is mated to the first end portion, wherein failure of the pin results in the second middle portion and the third end portion separating from the first end portion.

11. The tensile strength limiting system of claim 10, wherein one or more bearings are provided to allow for rotation of the second middle portion and the third end portion relative to the first end portion.

12. The tensile strength limiting system of claim 1, wherein the predetermined tensile loading is from 400 lbs. to 800 lbs.

13. The tensile strength limiting system of claim 12, wherein the predetermined tensile loading is less than half of the tensile strength of the optical fiber cable.

14. The tensile strength limiting system of claim 1, wherein the minimum bend radius of the strength member is nine inches.

15. The tensile strength limiting system of claim 1, wherein the minimum bend radius of the strength member is 6.5 inches.

* * * * *